United States Patent
Chakraborty et al.

(10) Patent No.: US 11,593,641 B2
(45) Date of Patent: Feb. 28, 2023

(54) AUTOMATIC GENERATION OF SYNTHETIC SAMPLES USING DYNAMIC DEEP AUTOENCODERS

(71) Applicant: Tata Consultancy Services Limited, Mumbai (IN)

(72) Inventors: Rupayan Chakraborty, Thane (IN); Sunil Kumar Kopparapu, Thane (IN)

(73) Assignee: Tata Consultancy Services Limited, Mumbai (IN)

( * ) Notice: Subject to any disclaimer, the term of this patent is extended or adjusted under 35 U.S.C. 154(b) by 771 days.

(21) Appl. No.: 16/575,562

(22) Filed: Sep. 19, 2019

(65) Prior Publication Data

US 2020/0090041 A1 Mar. 19, 2020

(30) Foreign Application Priority Data

Sep. 19, 2018 (IN) ............................... 201821034306

(51) Int. Cl.
*G06N 3/08* (2006.01)

(52) U.S. Cl.
CPC ...................................... *G06N 3/08* (2013.01)

(58) Field of Classification Search
CPC ........................................................ G06N 3/08
See application file for complete search history.

(56) References Cited

U.S. PATENT DOCUMENTS

| 10,679,129 B2* | 6/2020 | Baker .................. G06N 3/0472 |
| 10,740,651 B2* | 8/2020 | Santamaria-Pang ........................ G06K 9/6256 |
| 11,188,789 B2* | 11/2021 | Chen .................... G06K 9/6256 |
| 2016/0196374 A1* | 7/2016 | Bar .......................... G06F 11/36 703/2 |

(Continued)

OTHER PUBLICATIONS

Tang, S. et al. "The Generation Mechanism of Synthetic Minority Class Examples," *Proceedings of the 5th International Conference on Information Technology and Application in Biomedicine in conjunction with the 2nd International Symposium & Summer School on Biomedical and Health Engineering*, May 30-31, 2008, Shenzhen, China; pp. 444-447.

(Continued)

*Primary Examiner* — Viral S Lakhia
(74) *Attorney, Agent, or Firm* — Finnegan, Henderson, Farabow, Garrett & Dunner, LLP (57) ABSTRACT

Statistical pattern recognition relies on substantial amount of annotated samples for better learning and learning is insufficient in low resource scenarios. Creating annotated databases itself is a challenging task, requires lot of effort and cost, which may not always be feasible. Such challenges are addressed by the present disclosure by generating synthetic samples through automatic transformation using Deep Autoencoders (DAE). An autoencoder is trained using all possible combination of pairs between a plurality of classes that could be formed from a limited number of handful samples in a low resource database, and then the DAE is used to (Continued)

generate new samples when one class samples are given as input to the autoencoder. Again, the system of the present disclosure can be configured to generate number of training samples as required. Also, the deep autoencoder can be dynamically configured to meet requirements.

7 Claims, 7 Drawing Sheets

(56) References Cited

U.S. PATENT DOCUMENTS

| | | | |
|---|---|---|---|
| 2018/0165554 A1* | 6/2018 | Zhang | G06K 9/6256 |
| 2018/0218256 A1* | 8/2018 | Raviv | G06N 3/088 |
| 2019/0188065 A1* | 6/2019 | Anghel | G06F 11/0778 |
| 2020/0019852 A1* | 1/2020 | Yoon | G06V 10/764 |
| 2020/0050945 A1* | 2/2020 | Chen | G06N 3/0454 |
| 2020/0143240 A1* | 5/2020 | Baker | G06N 3/04 |

OTHER PUBLICATIONS

Varga, T. et al. "Effects of Training Set Expansion in Handwriting Recognition Using Synthetic Data," *Proceedings of the 11$^{th}$ Conference of the Graphonomics Society*, Nov. 2-5, 2003, Scottsdale, Arizona; pp. 1-4.

DeVries, T. et al. (2017). "Dataset Augmentation in Feature Space," retrieved from https://arxiv.org/pdf/1702.05538.pdf; pp. 1-12.

Amrita, B. (2014). "Emotion Conversion of Speech Signal Using Neural Network," *International Journal of Electrical, Electronics and Data Communication*, vol. 2, No. 9; pp. 34-36.

Burkhardt, F. et al. (2005). "A Database of German Emotional Speech," *Interspeech*; pp. 1-4.

Busso, C. et al. (2008). "IEMOCAP: Interactive emotional dyadic motion capture database," *Language Resources and Evaluation*, vol. 42, No. 4; pp. 1-29.

Garofolo, J.S et al. (1993). *DARPA TIMIT Acoustic-Phonetic Continuous Speech Corpus* (94 pages).

* cited by examiner

AUTOMATIC GENERATION OF SYNTHETIC SAMPLES USING DYNAMIC DEEP AUTOENCODERS

PRIORITY CLAIM

This U.S. patent application claims priority under 35 U.S.C. § 119 to Indian Patent Application No. 201821034306, filed on Sep. 19, 2018. The entire contents of the aforementioned application are incorporated herein by reference.

TECHNICAL FIELD

The disclosure herein generally relates to statistical machine learning, and, more particularly, to systems and methods for automatic generation of synthetic samples, for learning classifiers, using dynamic deep autoencoders.

BACKGROUND

Statistical machine learning systems require enough samples for its better learning and often face problem of under training, mainly due to lack of samples in training dataset. Creating a comprehensive training dataset involves human efforts, time and cost. In addition to that, sometimes, even if enough samples exist, the machine learning systems fail to learn class information properly, mostly because of non-representativeness of the samples over the class information space.

SUMMARY

Embodiments of the present disclosure present technological improvements as solutions to one or more of the above-mentioned technical problems recognized by the inventors in conventional systems.

In an aspect, there is provided a processor implemented method for automatic generation of synthetic samples comprising: receiving, by one or more hardware processors, a plurality of input samples pertaining to two or more classes; providing, by the one or more hardware processors, at least one portion of the plurality of input samples from each of the two or more classes for training a deep autoencoder; automatically generating, by the deep autoencoder, synthetic samples of a required class using at least one portion of remaining samples from the plurality of input samples pertaining to one or more classes other than the required class, wherein each of the at least one portion used generates a unique set of synthetic samples; evaluating, by the one or more hardware processors, accuracy of classification obtained from a classifier using the unique set of synthetic samples pertaining to each of the at least one portion of remaining samples; and dynamically modifying, by the one or more hardware processors, number of bottleneck nodes associated with the deep autoencoder based on a maximum evaluated accuracy of classification to generate a best set of synthetic samples.

In another aspect, there is provided a system comprising: one or more data storage devices operatively coupled to the one or more processors and configured to store instructions configured for execution by the one or more processors to: receive a plurality of input samples pertaining to two or more classes; provide at least one portion of the plurality of input samples from each of the two or more classes for training a deep autoencoder to automatically generate synthetic samples of a required class using at least one portion of remaining samples from the plurality of input samples pertaining to one or more classes other than the required class, wherein each of the at least one portion used generates a unique set of synthetic samples; evaluate accuracy of classification obtained from a classifier using the unique set of synthetic samples pertaining to each of the at least one portion of remaining samples; and dynamically modify number of bottleneck nodes associated with the deep autoencoder based on a maximum evaluated accuracy of classification to generate a best set of synthetic samples.

In yet another aspect, there is provided a computer program product comprising a non-transitory computer readable medium having a computer readable program embodied therein, wherein the computer readable program, when executed on a computing device, causes the computing device to: receive a plurality of input samples pertaining to two or more classes; provide at least one portion of the plurality of input samples from each of the two or more classes for training a deep autoencoder to automatically generate synthetic samples of a required class using at least one portion of remaining samples from the plurality of input samples pertaining to one or more classes other than the required class, wherein each of the at least one portion used generates a unique set of synthetic samples; evaluate accuracy of classification obtained from a classifier using the unique set of synthetic samples pertaining to each of the at least one portion of remaining samples; and dynamically modify number of bottleneck nodes associated with the deep autoencoder based on a maximum evaluated accuracy of classification to generate a best set of synthetic samples.

In an embodiment of the present disclosure, the one or more processors are further configured to receive number of synthetic samples to be generated for a classification domain; and select number of the one or more classes other than the required class based on the received number of synthetic samples.

In an embodiment of the present disclosure, the one or more processors are further configured to select the best set of synthetic samples from the at least one portion of remaining samples based on the evaluated accuracy of classification and a pre-defined threshold associated thereof based on a classification domain.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Complete Description of Embodiments

Statistical machine learning techniques are widely used in many pattern recognition problems as a successful alternative to human intelligence. Such automated processes rely on large amount of data for their implementation and lack of required large amount of data is many a time responsible for limitations in the development of the automated processes. However, creating such databases for machine learning systems is a complex process, need human efforts in terms of cost and time. In addition, one cannot better learn a statistical machine learner with limited samples. The present disclosure addresses these problems by facilitating generation of synthetic samples even from a small dataset by training autoencoders for sample generation. Synthetic sample generation, in accordance with the present disclosure, may also be used for data balancing in low resource scenario. A better generic data representation over class information may also be possible in class feature space as discussed hereinafter.

Referring now to the drawings, and more particularly to FIG. 1 through FIG. 8 where similar reference characters denote corresponding features consistently throughout the figures, there are shown preferred embodiments and these embodiments are described in the context of the following exemplary system and/or method.

Figure 1:
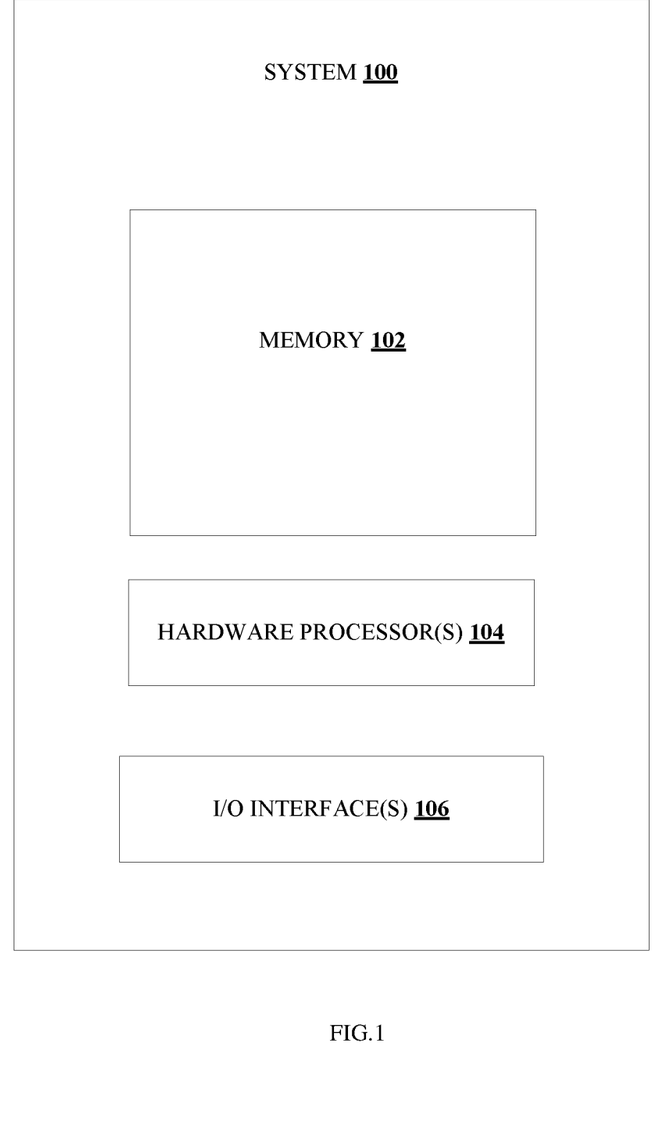
FIG. 1 illustrates an exemplary block diagram of a system for automatic generation of synthetic samples using dynamic deep autoencoders, in accordance with an embodiment of the present disclosure.

FIG. 1 illustrates an exemplary block diagram of a system 100 for automatic generation of synthetic samples using dynamic deep autoencoders in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

Figure 2:
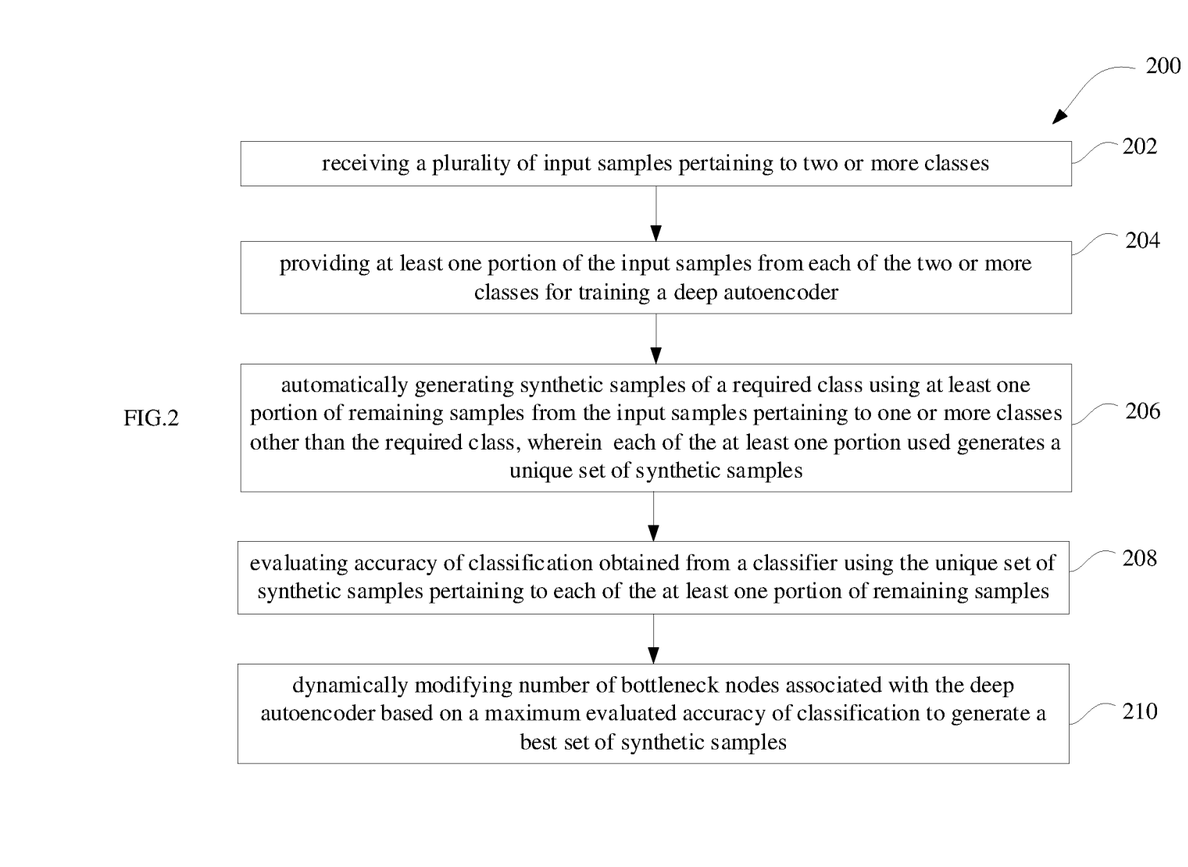
FIG. 2 illustrates an exemplary flow diagram for a computer implemented method for automatic generation of synthetic samples using dynamic deep autoencoders, in accordance with an embodiment of the present disclosure.

FIG. 2 illustrates an exemplary flow diagram for a computer implemented method 200 for automatic generation of synthetic samples using dynamic deep autoencoders, in accordance with an embodiment of the present disclosure. In an embodiment, the system 100 includes one or more data storage devices or memory 102 operatively coupled to the one or more processors 104 and is configured to store instructions configured for execution of steps of the method 200 by the one or more processors 104. The steps of the method 200 will now be explained in detail with reference to the components of the system 100 of FIG. 1. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

Let $C \in \{C_1, C_2, C_3, \ldots C_{n-1}\}$ be n classes in a low resource database characterized by a limited number of samples and the number of samples in the database is $S \in \{s_1, s_2, s_3, \ldots s_{n-1}\}$. In accordance with the present disclosure, a database having samples $S' \in \{s'_1, s'_2, s'_3, \ldots s'_{n-1}\}$ is generated such that $S' \gg S \Rightarrow s'_1 \gg s_1, s'_2 \gg s_2, s'_3 \gg s_3, \ldots s'_{n-1} \gg s_{n-1}$.

The samples $s'_1, s'_2, s'_3, \ldots s'_{n-1}$ are generated as follows:

$$s'_1 = \{s_1, s_{C_2 \to C_1}, s_{C_3 \to C_1}, \ldots s_{C_n \to C_1}\}$$

$$s'_2 = \{s_2, s_{C_1 \to C_2}, s_{C_3 \to C_2}, \ldots s_{C_n \to C_2}\}$$

$$s'_n = \{s_n, s_{C_1 \to C_n}, s_{C_2 \to C_n}, \ldots s_{C_{n-1} \to C_n}\} \to \quad (1)$$

Figure 3:
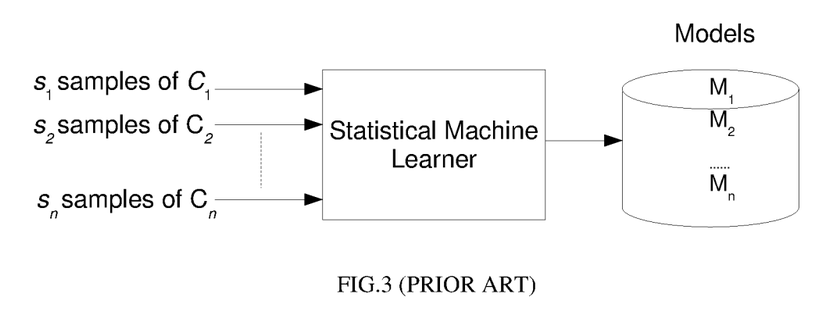
FIG. 3 illustrates a statistical machine learner trained with a dataset having limited samples S from a low resource dataset as seen in the art.
Figure 4:
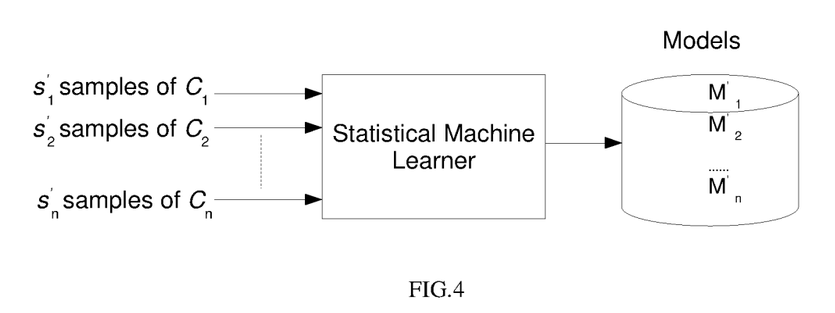
FIG. 4 illustrates a statistical machine learner trained with a dataset having autoencoder generated samples S', in accordance with an embodiment of the present disclosure.
Figure 5:
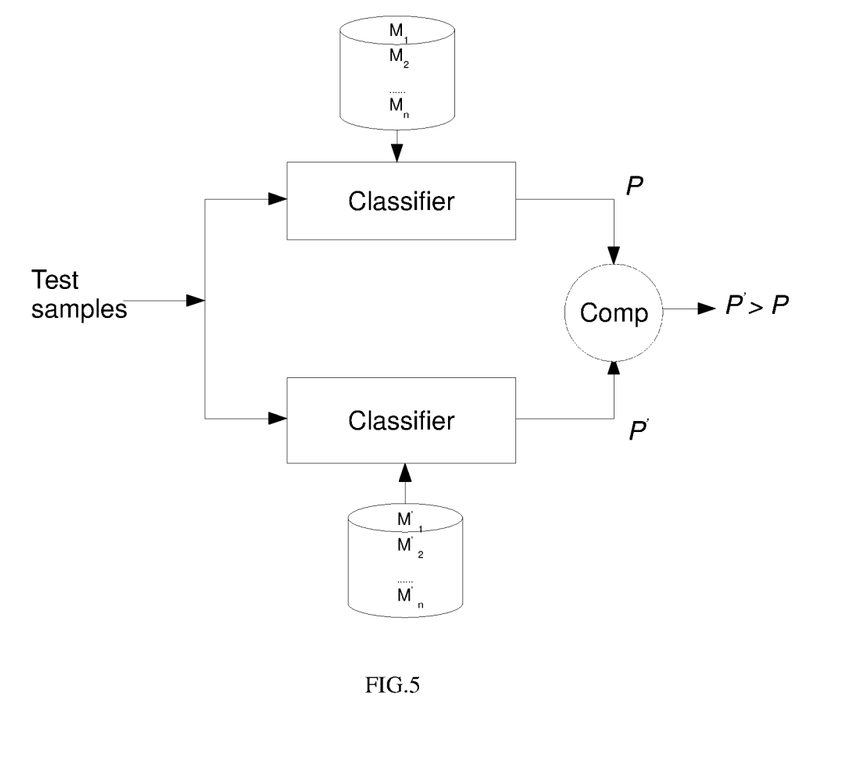
FIG. 5 illustrates a schematic representation of comparison between the statistical machine learners of FIG. 3 and FIG. 4 respectively.
Figure 6:
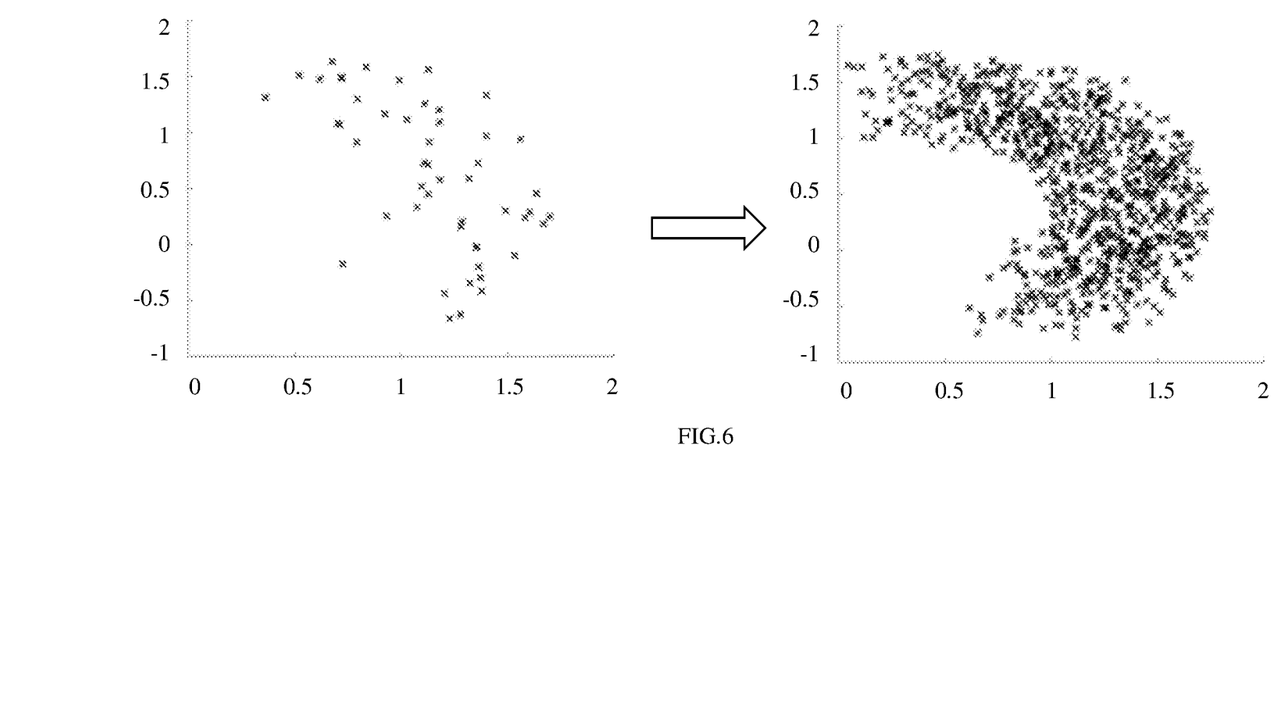
FIG. 6 illustrates representative to class information using samples S from a low resource dataset and autoencoder generated samples S', in accordance with an embodiment of the present disclosure.

In accordance with the present disclosure, all the transformations $C_j \to C_k$ are implemented using deep autoencoders, where each of the autoencoders are trained using all possible combination of pairs between two classes (class j and class k) that could possibly be formed from a low resource database. The performance of a system trained with the samples S' generated in accordance with the present disclosure is better compared to the performance of the system trained with the samples S, where S∈S'. In other words, better models (M'$_1$, M'$_2$, M'$_3$, ... M'$_n$) are created using S' compared to models (M$_1$, M$_2$, M$_3$, ... M$_n$) using S. The model generation mechanisms are depicted in the FIG. 3 and FIG. 4, wherein FIG. 3 illustrates a statistical machine learner trained with a dataset having limited samples S from a low resource dataset as seen in the art and FIG. 4 illustrates a statistical machine learner trained with a dataset having autoencoder generated samples S', in accordance with an embodiment of the present disclosure. FIG. 5 illustrates a schematic representation of comparison of performance (P'>P) between the statistical machine learners of FIG. 3 and FIG. 4, respectively. FIG. 6 illustrates representative to class information using samples S from a low resource dataset and autoencoder generated samples S', in accordance with an embodiment of the present disclosure. It may be noted that the generated samples (right side representation) are not sparse in the class space as seen with prior art (left side representation) and therefore produce a better representation of the class information in the high dimensional feature space. The graphical illustration represents different feature types along the X and Y axes.

In accordance with an embodiment of the present disclosure, to generate S', the one or more processors 104 are configured to receive, at step 202, a plurality of input samples pertaining to two or more classes. In an embodiment, the one or more processors 104 are configured to provide, at step 204, at least one portion of the plurality of input samples from each of the two or more classes for training a deep autoencoder. The deep autoencoder, automatically generates, synthetic samples of a required class, at step 206, using at least one portion of remaining samples from the plurality of input samples pertaining to one or more classes other than the required class. It may be noted that each of the at least one portion used generates a unique set of synthetic samples. For instance, if there is a class A with 5000 samples and a class B with 500 samples, assume 500 samples of each class provides 250000 input-output samples that may be used for training the deep autoencoder. Of the remaining 4500 samples from class A, any portion may be used to generate a unique set of synthetic samples. For instance, a set 500 samples from the remaining 4500 samples of class A generates a set of synthetic samples of class B. Another set of 500 samples generates another set of unique synthetic samples for class B and so on.

In another example, if there is a class A with 5000 samples and class B also with 5000 samples, as described in step 204, a portion of input samples may be taken from each class, say 500 samples each. Again 250000 input-output samples are now available that may be used for training the deep autoencoder. In this exemplary scenario, a portion of 4500 samples from either class may be used to generate synthetic samples of the other class.

In accordance with an embodiment of the present disclosure, a desired number of synthetic samples may be generated for a desired class by selecting number of the classes suitably. For instance, with reference to the exampled described herein above, 500 samples from the remaining 4500 samples of class A, if used, generates 500 samples of class B. Depending on the desired number of synthetic samples, different sets of samples from the remaining 4500 samples may be selected. For generating 1500 samples of class B, 3 different sets of 500 samples from the remaining 4500 samples may be used.

Let $\emptyset_{j \rightarrow k}$ represent an exemplary transfer function which convers class sample $C_j$ to other class sample $C_k$ such that $$\emptyset_{j \rightarrow k}\{C_j\} = C_k \rightarrow \quad (2)$$

In accordance with the present disclosure, a deep learning technique is used to automatically transform samples from one class to samples of other class. Each mapping technique $\emptyset_{j \rightarrow k}$ is learnt by the deep autoencoder that converts one class $C_j$ to another class $C_k$.

Let $\{(x_1(t), x_2(t), \ldots x_p(t)\}$ represent p samples of class $C_j$ and let $\{y_1^k(t), y_2^k(t), \ldots y_p^k(t)\}$, represent p samples of class $C_k$. Let $\Im(.)$ be an operator which extracts D dimensional features from $x_i^j(t)$ and $y_i^k(t)$, $$\vec{f}_{x_i^j(t)} = \Im(x_i^j(t)),$$

$$\vec{f}_{y_i^k(t)} = \Im(y_i^k(t)) \rightarrow \quad (3)$$

where $\vec{f}_{x_i^j(t)}, \vec{f}_{y_i^k(t)} \in \mathbb{R}^D$ are features executed for the i$^{th}$ sample of two pairs of classes $(x_i^j(t))$ and $(y_i^k(t))$.

In accordance with the present disclosure, the transformation may be defined as:

$$\phi_{j \rightarrow k}\left\{\{\vec{f}_{x_i^j(t)}\}_{i=1}^P\right\} \approx \{\vec{f}_{y_i^k(t)}\}_{i=1}^P \quad (4)$$

where $\emptyset_{j \rightarrow k}$ is the autoencoder that transforms the features of one class $x_i^j(t)$ to the features of another class $y_i^k(t)$. The training set for the autoencoder may be represented as $$\left\{\{\vec{f}_{x_i^j(t)}\}, \{\vec{f}_{x_i^j(t)}\}\right\}_{i=1}^P.$$

The autoencoder tries to learn the approximation of the transformation (or mapping)

$$\{\vec{f}_{x_i^j(t)}\}_{i=1}^P \xrightarrow{\phi_{j \rightarrow k}} \{\vec{f}_{y_i^k(t)}\}_{i=1}^P$$

so as to output $\vec{f}_{y_i^k(t)}$ when a given input is $\vec{f}_{x_i^j(t)}$ that may be represented as $$h_{W,b}\{\vec{f}_{x_i^j(t)}\}_{i=1}^P \approx \{\vec{f}_{y_i^k(t)}\}_{i=1}^P \quad (5)$$

where h represents the hypothesized outputs (considering W and b as weight matrix and bias respectively)

Since the transformation is non-linear, the learning is through a compressed (like Principle Component Analysis) or an expanded (information encoder in communication theory) representation of the input. Let $a_q^{(r)}$ be the activation of hidden unit in the autoencoder, where $1 \leq r \leq n_l$. So the activated output is $a_q^{(r)}(\vec{f}_{x_i^j(t)})$ when $\vec{f}_{x_i^j(t)}$ is an input. Therefore, $$\hat{\rho}_q = \frac{1}{H} \sum_{q=1}^H \left[a_q^{(r)}(\vec{f}_{x_i^j(t)})\right] \quad (6)$$

where $\hat{\rho}_q$ is the activation of hidden unit averaging over the training data H represents the maximum number of bottleneck nodes in the autoencoder. In accordance with the present disclosure, a constraint is enforced so that $\hat{\rho}_q=\rho$, wherein $\rho$ is the sparsity parameter. To achieve this, an extra penalty term is considered to the optimization objectives that penalizes $\hat{\rho}_j$ deviating significantly from $\rho$ and is represented as, $$\sum_{q=1}^{H} \rho \log \frac{\rho}{\hat{\rho}_q} + (1-\rho) \log \frac{1-\rho}{1-\hat{\rho}_q} = \sum_{q=1}^{H} KL(\rho\|\hat{\rho}_q) \quad (7)$$

where H is the number of neurons in the hidden layer and the index q is summing over all the nodes in that layer, and $KL(\rho\|\hat{\rho}_q)$ is the Kullback-Leibler divergence between the two Bernoulli random variables with mean $\rho$ and $\hat{\rho}_q$. The overall cost function is defined as $$C(W, b) = C(W, b) + \beta \sum_{q=1}^{H} KL(\rho\|\hat{\rho}_q) \quad (8)$$

where C(W,b) is pre-defined cost function and $\beta$ is the weight of sparsity penalty term. The objective is to minimize C(W,b) as a function of W and b. In backpropagation, applying a batch gradient descent optimization method, one iteration updates W and b as follows:

$$W_{pq}^{(r)} = W_{pq}^{(r)} - \alpha \frac{\partial C(W, b)}{\partial W_{pq}^{(r)}} \quad (9)$$

$$b_p^{(r)} = b_p^{(r)} - \alpha \frac{\partial C(W, b)}{\partial b_p^{(r)}}$$

where $\alpha$ is the learning rate, r denotes index for the layer, and p,q denote the index for the nodes in two different layers. So the partial derivative of the overall cost function is calculated as $$\frac{\partial C(W, b)}{\partial W_{pq}^{(r)}} = \left[ \frac{1}{H} \sum_{q=1}^{H} \frac{\partial C\left(W, b; \vec{f}_{x_i^j(t)}, \vec{f}_{y_i^k(t)}\right)}{\partial W_{pq}^{(r)}} + \lambda W_{pq}^{(r)} \right] \quad (10)$$

$$\frac{\partial C(W, b)}{\partial b_p^{(r)}} = \left[ \frac{1}{H} \sum_{q=1}^{H} \frac{\partial C(W, b); \vec{f}_{x_i^j(t)}, \vec{f}_{y_i^k(t)}}{\partial b_p^{(r)}} \right]$$

For backpropagation in multi-layer autoencoders, a feed-forward pass is performed, the activation for layers $L_2$, $L_3$, and so on are computed up to the output layer $L_{n_l}$. Then for each output unit p in the layer $n_l$ (the output layer), and for input $f_x$ and output $f_y$, set $$\delta_p^{n_l} = \frac{\partial \frac{1}{2}\|f_y - h_{w,b}(f_x)\|^2}{\partial z_p^{n_l}} = (f_y - a_p^{(n_l)})f'(z_p^{n_l}) \quad (11)$$

where $a_p^{(n_l)}$ denotes the activation (i.e., output value) of unit p of layer $n_l$, and $z_p^{n_l}$ denotes the total weighted sum (i.e., $\Sigma p$) of inputs to the unit p in the layer $n_l$ (which also includes the bias). Therefore, $$a_p^{(n_l)} = A(z_p^{n_l})$$

$$z_p^{n_l} = W^{n_l} a^{n_l} + b^{n_l} \rightarrow \quad (12)$$

Now for $r=n_l-1, n_l-2, n_l-3, \ldots 2$ and for each node p in layer r and incorporating Kullback-Leibler divergence term into the derivative calculation, $$\delta_p^{(r)} = \left( \sum_{p=1}^{h} W_{pq}^{(r)} \delta_q(r+1) + \beta \left( -\frac{\rho}{\hat{\rho}_q} + \frac{1-\rho}{1-\hat{\rho}_q} \right) \right) f' z_p^{(r)} \quad (13)$$

The partial derivatives may be then computed as follows, $$\frac{\partial C(W, b; f_x, f_y)}{\partial W_{pq}^{(r)}} = a_p^{(r)} \delta_q^{(r+1)} \quad (14)$$

To train the deep autoencoder, the steps of the Gradient Descent method needs to be repeatedly performed to reduce the cost function C(W,b).

In accordance with an embodiment of the present disclosure, the one or more processors 104 are configured to evaluate, at step 208, accuracy of classification obtained from a classifier using the unique set of synthetic samples generated at step 206. The classifier may be any conventional classifier like Support Vector Machines (SVM) or Artificial Neural Networks (ANN). Depending on the evaluated accuracy and a pre-defined threshold that may be based on the classification domain, a best set of synthetic samples may be selected for training. Thus, in accordance with the present disclosure, the system of the present disclosure enables generating the best set of synthetic samples for training thereby improving the classification results.

Figure 7:
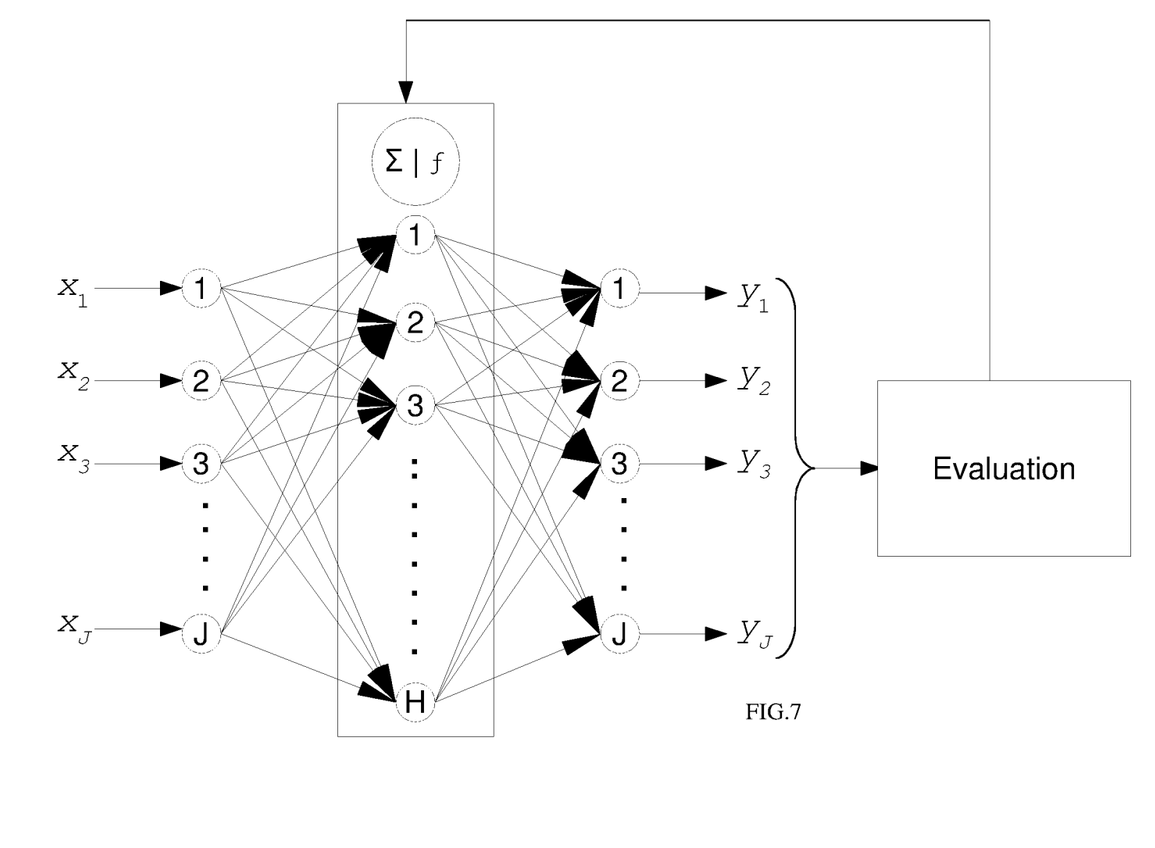
FIG. 7 illustrates a schematic representation of an exemplary dynamic deep autoencoder in accordance with an embodiment of the present disclosure.

In accordance with an embodiment of the present disclosure, the one or more processors 104 are configured to dynamically modify, at step 210, number of bottleneck nodes associated with the deep autoencoder based on a maximum evaluated accuracy of classification to generate a best set of synthetic samples. FIG. 7 illustrates a schematic representation of an exemplary dynamic deep autoencoder in accordance with an embodiment of the present disclosure. It may be noted that when synthetic samples ($Y_1$-$Y_J$) of a desired class are generated using input samples($X_1$-$X_J$) of another class, the accuracy of classification is evaluated in accordance with step 208. The number of bottleneck nodes (H) may be dynamically modified such that the accuracy of classification is maximized thereby enabling a dynamic architecture for the autoencoder for improving the classification results.

Experimental Validation: Emotional Speech Sample Generation

A system and method of the present disclosure was tested for an application in emotional speech sample generation. Let $\{A_j, V_j\}$ and $\{A_k, V_k\}$ represent emotion $E_j$ and $E_k$ respectively in 2 Dimensional Arousal (A)-Valence (V) space. Consider an emotion transfer (or mapping) function $\emptyset_{j\rightarrow k}$ which converts one spoken emotional utterance $E_j$ to other spoken emotion $E_k$ such that, $$\emptyset_{j\rightarrow k}\{E_j\} = E_k \text{ or } \emptyset_{j\rightarrow k}\{A_j, V_j\} = \{A_k, V_k\} \rightarrow \quad (15)$$

Each mapping technique $\emptyset_{j \to k}$ is learnt by a deep autoencoder that converts one emotion $E_j$ to other emotion $E_k$. Let $\{x_1(t), x_2(t), \ldots x_p(t)\}$ represent p speech samples of emotion $E_j$ and let $\{y_1^k(t), y_2^k(t), \ldots y_p^k(t)\}$, represent p samples of emotion $E_k$. Let $\Im(.)$ be an operator which extracts D dimensional acoustic features (High Level Descriptors) from $x_i^j(t)$ and $y_i^k(t)$, $$\vec{f}_{x_i^j(t)} = \Im(x_i^j(t)),$$

$$\vec{f}_{y_i^k(t)} = \Im(y_i^k(t)) \to \quad (16)$$

analogous to (3) above
where $\vec{f}_{x_i^j(t)}, \vec{f}_{y_i^k(t)} \in \mathbb{R}^D$ are High Level Descriptors (HLD) executed for the $i^{th}$ sample of neutral speech ($x_i^j(t)$) and emotional speech ($y_i^k(t)$).

In accordance with the present disclosure, the transformation may be defined as:

$$\phi_{j \to k}\left\{\{\vec{f}_{x_i^j(t)}\}_{i=1}^P\right\} \approx \{\vec{f}_{y_i^k(t)}\}_{i=1}^P \quad (17)$$

analogous to (4) above
where $\emptyset_{j \to k}$ is the autoencoder that transforms the acoustic features of one emotional speech $x_i^j(t)$ to features of another emotional speech $y_i^k(t)$. The training set for the autoencoder may be represented as $$\left\{\{\vec{f}_{x_i^j(t)}\}, \{\vec{f}_{x_i^j(t)}\}\right\}_{i=1}^P.$$

The autoencoder tries to learn the approximation of the transformation (or mapping)

$$\{\vec{f}_{x_i^j(t)}\}_{i=1}^P \xrightarrow{\phi_{j \to k}} \{\vec{f}_{y_i^k(t)}\}_{i=1}^P$$

so as to output $\vec{f}_{y_i^k(t)}$ when a given input is $\vec{f}_{x_i^j(t)}$.

To validate the method of the present disclosure, experiments were conducted with a plurality of deep autoencoders to learn the mapping function $\emptyset_{j \to k}$ for different transformations using 4 emotion classes as detailed hereinafter. Since the feature values are normalized in the interval [−1;+1], the output activation function used for all the deep autoencoders is sigmoid. Since the transformation of the spoken emotions have been carried out in acoustic feature domain, evaluation through human listening is not possible; therefore the performance was evaluated through recognition. Berlin emotional database ("A database of German emotional speech" in INTERSPEECH 2005 by Felix Burkhardt et al.) referred hereinafter as Emo-DB was used for the experimentation. The Emo-DB dataset is divided into 30%-40%-30% for training (both the emotion recognizer and the deep autoencoders), generating samples (for the deep autoencoders) and testing the emotion recognizer. The input and output of the autoencoders are the high dimensional acoustic features extracted from the emotional spoken utterances. Statistical audio features (known also as high level descriptors (HLDs) were extracted from the popular low level audio descriptors (i.e. LLDs) like Mel-frequency Cepstral Coefficients (MFCCs), pitch, Formant frequency (F0), Zero Crossing Rate (ZCR), Fast Fourier Transform (FFT), and the like so that it carries more relevant information about the emotion compared to just using LLDs. Since the HLDs are statistics (up to fourth order) of LLDs over all smaller frames (size=25 ms, step=10 ms), the dimension of the acoustic features remain same for all irrespective of the time duration of the spoken utterances. Same dimensional feature vectors fits well for setting up the input and output pairs for training and as well as testing the neural network. Experimentations have been carried out using popular datasets, and the spoken emotion transformation performances are evaluated through recognition.

Figure 8:
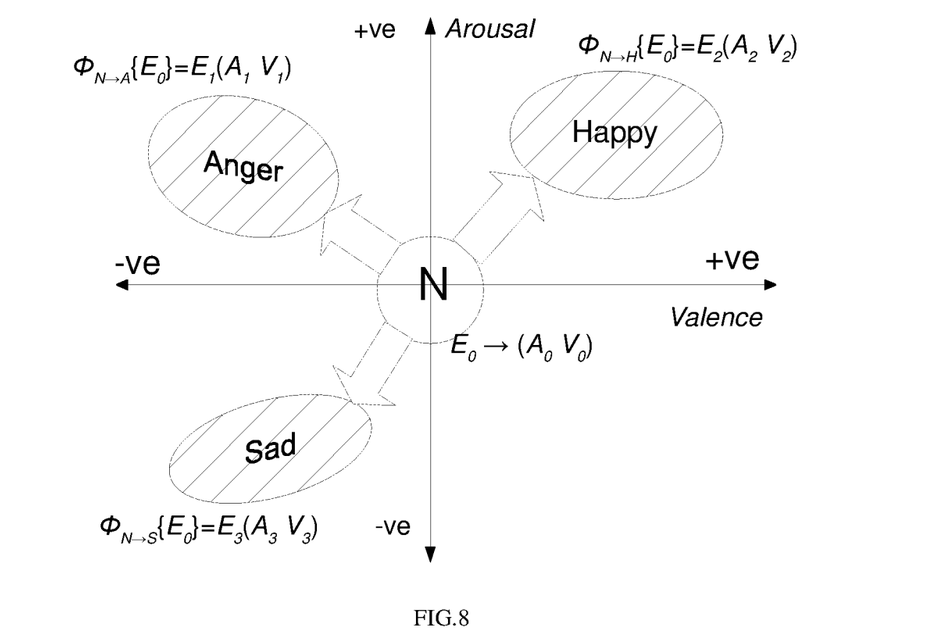
FIG. 8 illustrates neutral to other emotions (anger, happy, sad) mapping in 2 Dimensional Arousal (A)-Valence (V) space, in accordance with an embodiment of the present disclosure.

FIG. 8 illustrates neutral to other emotions (anger, happy, sad) mapping in 2 Dimensional Arousal (A)-Valence (V) space in accordance with the present disclosure. In this example, samples of 4 emotional classes (neutral, anger, happy, and sad) have been taken from Emo-DB database, and neutral samples are taken from 4 emotional classes (neutral, anger, happy, and sad) have been taken from Emo-DB database, and neutral samples are taken from the Interactive emotional dyadic motion capture database (IEMOCAP) and TIMIT (Acoustic-Phonetic Continuous Speech Corpus). The distribution of the number of samples used for training and testing (for both the deep autoencoders and the recognizer) from all the three databases are presented in Table 1 below.

TABLE 1

Distribution of samples used for training and testing from all databases

| | Emo-DB | | IEMOCAP | TIMIT |
|---|---|---|---|---|
| | Train | Test | Test | Test |
| Anger | 127 | — | — | — |
| Happy | 71 | — | — | — |
| Neutral | 63 | 16 | 4517 | 1568 |
| Sad | 62 | — | — | — |

To make the result statistically significant, 5-fold cross-validation was performed to evaluate the performance of the recognition system. In this way, it was ensured that the samples which were used for testing were not part of the train set. The samples for testing are those which are recognized (by emotion recognizer) as neutral from IEMOCAP ("IEMOCAP: Interactive emotional dyadic motion capture database" by Carlos Busso et al. in Language Resources and Evaluation 2008 and "TIMIT Acoustic-phonetic continuous speech corpus" by J. S. Garofolo et al.) databases, not all those which were annotated as neutral. The emotion models were generated using the training samples from Emo-DB dataset as presented in the Table 1. All the audio samples used were of 16 kHz, 16-bit, mono 384 dimensional feature vector that consists of HLDs (mean, standard deviation, skewness, kurtosis, extremes, linear regressions) from LLDs (ZCR, Root Mean Square (RMS) energy, F0, Harmonics to Noise Ratio (HNR), MFCCs) was extracted from each audio file using "IS09 emotion" configuration file of openSMILE toolkit.

3 separate autoencoders were used for the spoken emotion transformation, one for neutral→anger (namely N-A), one for neutral→happy (namely, N-H) and one for neutral→sad (namely N-S) as shown in FIG. 8. As presented in Table 1, 63*127=8001 samples (for neutral→anger), 63*71=4473 samples (for neutral→happy), and 63*62=3906 samples (for neutral→sad) were considered for training the autoencoders for emotion transformation. Keras, a Python™ based deep learning toolkit has been used to implement the deep autoencoders. The network configuration for the deep autoencoders like the number of hidden layers and nodes were finalized by conducting extensive experimentations. 10% of the training samples were taken for validating the network configuration which produces minimum errors over different set of network configurations. Specifically, the best input-hidden-output configurations for N→A, N→H, and N→S are found 384-1024-1024-1024-384, 384-512-512-512-384, and 384-512-512-512-384, respectively. There were 3 hidden layers for all autoencoders, whereas for N→A autoencoder, 1024 neurons were used compared to 512 neurons that is for N→H and N→S autoencoders. The output activation function used for all autoencoders is a rectifier linear unit (ReLU).

Once the deep autoencoders were trained, they were given neutral samples from 3 datasets to generate anger, happy, and sad samples, which were then fed to the pre-trained speech emotion recognizer for testing. The recognizer is based on the standard SVM classifier, and LibSVM toolkit is used for building the same. However, the generated samples were also tested using ANN classifier, but better results were obtained using SVM. The classifier was trained using the training samples from Emo-DB dataset as presented in Table 1. While testing with the generated samples, recognition accuracies for 5 different sets of training samples that were used to train the recognizer are presented separately in Table 2.

TABLE 2

Recognition accuracies (%) for the autoencoder generated anger, happy and sad samples

|  |  | N→A | N→H | N→S |
|---|---|---|---|---|
|  |  | Test with Emo-DB | | |
| Train with | Set 1 | 93.75 | 87.5 | 81.2 |
| Emo-DB | Set 2 | 100 | 81.2 | 87.5 |
| samples | Set 3 | 100 | 93.75 | 93.75 |
|  | Set 4 | 87.5 | 93.75 | 87.5 |
|  | Set 5 | 93.75 | 87.5 | 100 |
|  | Average | 95 | 88.75 | 90 |
|  |  | Test with IEMOCAP | | |
| Train with | Set 1 | 92.4 | 89.28 | 86.67 |
| Emo-DB | Set 2 | 93.68 | 87.88 | 88.96 |
| samples | Set 3 | 94.19 | 90.05 | 88.58 |
|  | Set 4 | 90.68 | 92.41 | 89.6 |
|  | Set 5 | 92.79 | 89.6 | 90.75 |
|  | Average | 92.9 | 89.84 | 88.92 |
|  |  | Test with TIMIT | | |
| Train with | Set 1 | 98.8 | 97.2 | 95.52 |
| Emo-DB | Set 2 | 98.1 | 95.6 | 95.46 |
| samples | Set 3 | 97.49 | 97.12 | 95.12 |
|  | Set 4 | 98.05 | 95.46 | 95.9 |
|  | Set 5 | 97.63 | 95.97 | 95.95 |
|  | Average | 98.01 | 96.28 | 95.4 |

As shown in Table 2, for Emo-DB, large variance in accuracy is found for anger, happy, and sad samples which were generated from neutral samples. This is because of the few samples (i.e.16) for testing. The train:test is considered to be 80%:20% always for all 5 sets of cross validation experiments. The average accuracy of 96:56% (averaging over anger, happy, and sad classes) is observed for the TIMIT dataset having 4517 neutral samples. And an average accuracy of 90:55% (averaging over anger, happy, and sad classes) is observed for 1568 neutral samples from IEMO-CAP dataset.

In Table 3, class confusion matrix for the emotion recognition is presented.

TABLE 3

Class confusion matrix for emotion recognition, A: anger, H: happy, S: sad, N: neutral

|  |  | Given test sample | | |
|---|---|---|---|---|
|  |  | A | H | S |
| Recognized | A | 96.7 | 5.25 | 0 |
| as | H | 3.3 | 94.6 | 0 |
|  | S | 0 | 0 | 93.72 |
|  | N | 0 | 0.15 | 6.28 |

Emotion classes (namely, anger, happy, and sad) generated from all neutral samples (from all 3 databases) were used only for testing with emotion recognizer. Class confusion matrix with high diagonal values suggests that the autoencoder generated acoustic features were mostly correctly classified by the emotion recognition system. As usual, slight confusion (around 3:3-5:5%) is observed between anger versus happy and vice-a-versa. Similarly and as expected, 6:28% of confusion was observed between sad and neutral. The method of synthesizing acoustic features of emotional utterances as discussed here may aid in providing enough samples to better (or deeply) train modern learning machines or to balance the skewed datasets, or to get rid of difficulties of complex adaptation techniques traditionally used in mismatched scenarios. As seen, the system and method of the present disclosure was tested to generate speech emotion samples in acoustic feature domain using publicly available popular dataset having limited number of samples, and then the transformed samples were used to create the models by training a conventional classifier. However, the systems and methods of the present disclosure are generic and a person skilled in the art may note that they are applicable to any classification task in real world scenarios such as healthy-unhealthy, corrupt-clean, and the like.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method for automatic generation of synthetic samples, the method comprising the steps of:

receiving, by one or more hardware processors, a plurality of input samples pertaining to two or more classes;

providing, by the one or more hardware processors, at least one portion of the plurality of input samples from each of the two or more classes for training a deep autoencoder;

automatically generating, by the deep autoencoder, synthetic samples of a required class using at least one portion of remaining samples from the plurality of input samples pertaining to one or more classes other than the required class, wherein each of the at least one portion used generates a unique set of synthetic samples, wherein the synthetic samples are generated by transforming dimensional features of the at least one portion of remaining samples pertaining to the one or more classes and learning approximation of the transformation of the dimensional features to generate the synthetic samples of the required class, and wherein the transformation of the dimensional features is defined as:

$$\phi_{j \to k}\left\{\{\vec{f}_{x_i^j(t)}\}_{i=1}^P\right\} \approx \{\vec{f}_{y_i^k(t)}\}_{i=1}^P$$

where $\vec{f}_{x_i^j(t)}, \vec{f}_{y_i^k(t)} \in \mathbb{R}^D$ are dimensional features executed for an $i^{th}$ sample of classes ($x_i^j(t)$) and ($y_i^k(t)$) and $\emptyset_{j \to k}$ is the deep autoencoder that transforms the dimensional features of one class $x_i^j(t)$ to the features of another class $y_i^k(t)$;

evaluating, by the one or more hardware processors, accuracy of classification obtained from a classifier using the unique set of synthetic samples pertaining to each of the at least one portion of remaining samples; and dynamically modifying, by the one or more hardware processors, number of bottleneck nodes associated with the deep autoencoder based on a maximum evaluated accuracy of classification to generate a best set of synthetic samples.

2. The processor implemented method of claim 1, wherein the step of automatically generating synthetic samples is preceded by:

receiving number of synthetic samples to be generated for a classification domain; and selecting number of the one or more classes other than the required class based on the received number of synthetic samples.

3. The processor implemented method of claim 1, wherein the step of evaluating accuracy of classification is followed by selecting the best set of synthetic samples from the at least one portion of remaining samples based on the evaluated accuracy of classification and a pre-defined threshold associated thereof based on a classification domain.

4. A system comprising:

one or more data storage devices operatively coupled to one or more hardware processors and configured to store instructions configured for execution by the one or more hardware processors to:

receive a plurality of input samples pertaining to two or more classes;

provide at least one portion of the plurality of input samples from each of the two or more classes for training a deep autoencoder to automatically generate synthetic samples of a required class using at least one portion of remaining samples from the plurality of input samples pertaining to one or more classes other than the required class, wherein each of the at least one portion used generates a unique set of synthetic samples, wherein the synthetic samples are generated by transforming dimensional features of the at least one portion of remaining samples pertaining to the one or more classes and learning approximation of the transformation of the dimensional features to generate the synthetic samples of the required class, and wherein the transformation of the dimensional features is defined as:

$$\phi_{j \to k}\left\{\{\vec{f}_{x_i^j(t)}\}_{i=1}^{P}\right\} \approx \{\vec{f}_{y_i^k(t)}\}_{i=1}^{P}$$

where $\vec{f}_{x_i^j(t)}, \vec{f}_{y_i^k(t)} \in \mathbb{R}^D$ are features executed for an $i^{th}$ sample of two pairs of classes ($x_i^j(t)$) and ($y_i^k(t)$) and $\emptyset_{j \to k}$ is the deep autoencoder that transforms the dimensional features of one class $x_i^j(t)$ to the features of another class $y_i^k(t)$;

evaluate accuracy of classification obtained from a classifier using the unique set of synthetic samples pertaining to each of the at least one portion of remaining samples; and dynamically modify number of bottleneck nodes associated with the deep autoencoder based on a maximum evaluated accuracy of classification to generate a best set of synthetic samples.

5. The system of claim 4, wherein the one or more processors are further configured to:

receive number of synthetic samples to be generated for a classification domain; and select number of the one or more classes other than the required class based on the received number of synthetic samples.

6. The system of claim 4, wherein the one or more processors are further configured to select the best set of synthetic samples from the at least one portion of remaining samples based on the evaluated accuracy of classification and a pre-defined threshold associated thereof based on a classification domain.

7. A computer program product comprising a non-transitory computer readable medium having a computer readable program embodied therein, wherein the computer readable program, when executed on a computing device, causes the computing device to:

receive a plurality of input samples pertaining to two or more classes;

provide at least one portion of the plurality of input samples from each of the two or more classes for training a deep autoencoder to automatically generate synthetic samples of a required class using at least one portion of remaining samples from the plurality of input samples pertaining to one or more classes other than the required class, wherein each of the at least one portion used generates a unique set of synthetic samples, wherein the synthetic samples are generated by transforming dimensional features of the at least one portion of remaining samples pertaining to the one or more classes and learning approximation of the transformation of the dimensional features to generate the synthetic samples of the required class, and wherein the transformation of the dimensional features is defined as:

$$\phi_{j \to k}\left\{\{\vec{f}_{x_i^j(t)}\}_{i=1}^{P}\right\} \approx \{\vec{f}_{y_i^k(t)}\}_{i=1}^{P}$$

where $\vec{f}_{x_i^j(t)}, \vec{f}_{y_i^k(t)} \in \mathbb{R}^D$ are features executed for an $i^{th}$ sample of two pairs of classes ($x_i^j(t)$) and ($y_i^k(t)$) and $\emptyset_{j \to k}$ is the deep autoencoder that transforms the dimensional features of one class $x_i^j(t)$ to the features of another class $y_i^k(t)$;

evaluate accuracy of classification obtained from a classifier using the unique set of synthetic samples pertaining to each of the at least one portion of remaining samples; and dynamically modify number of bottleneck nodes associated with the deep autoencoder based on a maximum evaluated accuracy of classification to generate a best set of synthetic samples.

* * * * *